Figure 1:
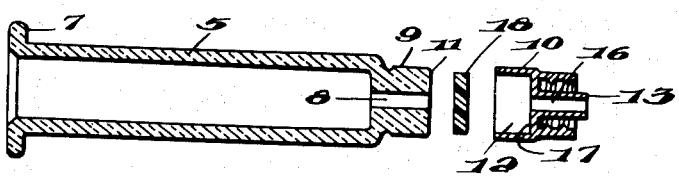

Oct. 27, 1953

G. M. HICKEY 2,656,836

HYPODERMIC SYRINGE

Filed Sept. 26, 1950

INVENTOR:
George M. Hickey,
BY: Pierce, Scheffler & Parker,
ATTORNEYS.

Patented Oct. 27, 1953

2,656,836

UNITED STATES PATENT OFFICE 2,656,836

HYPODERMIC SYRINGE

George M. Hickey, Paoli, Pa., assignor to J. Bishop & Co. Platinum Works, a corporation of Pennsylvania Application September 26, 1950, Serial No. 186,841

5 Claims. (Cl. 128—218)

The present invention relates to glass hypodermic syringes and more particularly to an improved tip construction and method of producing the same on the barrel of the syringe.

It has been the practice to provide glass syringe barrels with a metal tip to which the hypodermic needle is applied and connected, the hypodermic needle and metal tip being provided with interlocking parts to hold them together in service. Metal tips have been fastened to glass syringe barrels in various ways. At the present time one conventional method commonly employed is to prepare the glass tip of the syringe barrel with a fused metallic surface and to solder the metal tip in position on the prepared surface. Another method is to attach the metal tip to the glass tip by means of an adhesive or cement and a third method is to make the glass tip of the syringe barrel and the cavity in the metal tip of predetermined and very exact dimensions and to press the glass tip into the cavity, thereby providing a secure press-fit connection between the parts.

The first method produces a firm connection, but requires the production of the fused metal surface on the glass tip and involves the additional soldering operation. The use of an adhesive cement for the joint presents the possibility of the same effecting or being affected by the fluids to be dispensed. The third method requires great precision in the formation and preparation of the glass and metal tips and the great pressure required to force the glass tip into the cavity in the metal tip to get good contact with the bottom of the cavity results in excessive breakage of the glass barrels. Also with this press fit, slight irregularities in either the glass or metal tip produce pressure spots which result in breakage and, conversely, often results in slight open areas or cavities between the end of the glass tip and the bottom of the metal cap into which foreign matter and or fluids can enter and become trapped. In fact with all three of those commonly used methods of tip assembly there is the danger of leaving slight pockets or crevices in which foreign matter and fluids administered through the syringe can be trapped so as to make it difficult if not impossible to properly clean and sterilize the syringe.

The primary object of the invention is to provide an improved metal tip and glass barrel construction for hypodermic syringe and a method for producing the same which will overcome the disadvantages of the present constructions and methods of assembly and produce a smooth bore through the glass and metal tips free of cavities and crevices in which foreign matter or fluids might lodge.

A further object is to provide a glass syringe barrel with a metal tip which is assembled without the use of solder or adhesives and in which the metal tip is secured by a press fit to the glass tip but in which the production of excessive pressure or shock on the end of the glass tip, which otherwise might result in chipping or breakage thereof, is relieved by a cushioning fillet or insert in the bottom of the cavity in the metal tip which also serves to fill all cavities and crevices between the glass and metal and to provide a smooth bore through the tip which can be thoroughly cleaned and sterilized without difficulty.

Figure 2:
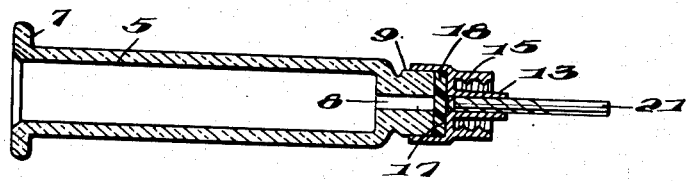
Figure 3:
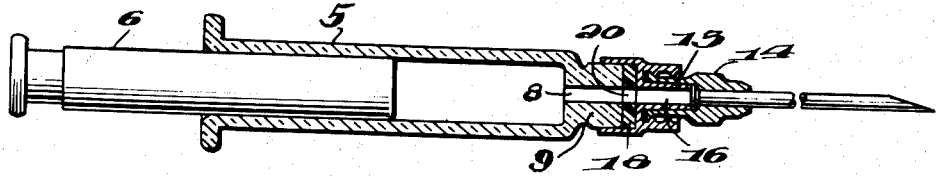
Figure 4:
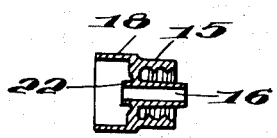

These and other objects and advantages of the invention will be apparent from the ensuing detailed description of the invention with reference to the accompanying drawings which illustrate the improved tip construction and method of producing the same and in which:

Fig. 1 is an exploded view with the parts in axial section in the order of assembly, Fig. 2 is an axial section showing the assembled tip ready for the drilling operation to open the bore through the insert, and Fig. 3 is an axial section through a completed syringe with needle attached, and Fig. 4 is a sectional view of a modified form of metal tip.

Referring now more particularly to the drawings, the numeral 5 indicates the cylindrical glass body or barrel of the syringe which is open at one end for reception of the usual piston 6 and is provided at the open end with an outwardly projecting annular flange 7 which serves as a finger grip. The other end of the syringe barrel is closed, except for an axial effluent bore and is formed with a tip 9 of reduced diameter with respect to the barrel, the effluent bore 8 extending axially through the tip 9. The glass tip 9, which as shown, is integral with the barrel 5 is cylindrical and is ground with straight sides or with a slight taper for the reception of a metal tip 10 as hereinafter described. The end face 11 of the tip 9 is normal to the axis thereof and may be ground also if desired.

The metal tip 10 which is also cylindrical in shape is provided with an axial machined socket or cavity 12 in the proximal end which is dimensioned to receive the glass tip 9 with a press fit and on the other end is formed with a tapered tip 13 to fit the hub of a hypodermic needle 14 and is also preferably provided with locking threads 15 for releasably locking the needle hub on the tip 13.

The metal tip 10 is provided with an effluent axial bore 16 of the same diameter as that of the bore 8 in the glass tip, and in axial alinement therewith, which opens on the bottom 17 of the cavity 12 and extends through the tip 13. The bottom of the cavity 12 in the metal tip 10 is preferably flat and in a plane normal to the axis of the tip.

Interposed between the end 11 of the glass tip and the bottom 17 of the cavity 12 is a fillet 18 of suitable plastic material which serves as a cushioning pad or disc between the metal and the end of the glass tip and to fill any cracks or crevices which might otherwise occur at this point. When pressure is applied to force the glass tip 9 firmly into the socket of the metal tip 10 in the assembly of the tip, the fillet 18 absorbs the impact and by preventing metal to glass contact between the end face 11 of the tip and the bottom face 17 of the cavity in the metal tip 10 eliminates the cause of chipping and breaking of the glass tip at this point. The fillet 18 being soft will flow sufficiently to conform exactly with any irregularities in the end of the glass tip or opposed metal surface, completely filling the space between them and eliminating the possibility of any cracks or crevices being left, in which dirt or fluids might otherwise be trapped in use of the syringe. The center of the fillet 18 is drilled out to provide a bore 20 therethrough connecting the effluent bores 8 and 16 in the glass and metal tips.

The selection of materials for the fillet 18 is important. The same should be of a material which is tough and durable, which will be capable of deforming or flowing slightly under compression, have a melting point of 360° F. or higher so as to withstand sterilizing temperatures, and be non-toxic and chemically inert to medicines and drugs administered by a hypodermic syringe. Certain plastics have been found most suitable for the purpose and synthetic polyamides, e. g. nylon, and the trifluorochloroethylene and tetrafluorethylene polymers are preferred.

In carrying out the method of producing the improved tip according to the invention, the glass barrel 5 is formed with the integral tip 9 and effluent bore 8 therethrough and the surface of the tip 9 is ground to provide the proper finish and dimension for a press fit in the metal cap 10. The metal cap 10 is machined to form the socket 12 therein with walls of the proper dimension for a press fit on the tip 9 and a flat bottom to seat the plastic fillet 18 and the end face 11 of the tip 9. The axial effluent bore 16 is drilled through tip 13 of the metal tip 10. After the glass and metal tips are prepared for assembly, the plastic fillet of nylon or polytetrafluorethylene in the form of an imperforate disc cut to a size to fill the bottom of the cavity is placed therein and the glass tip 9 is forced under pressure into the cavity 12 forming a press fit between the cylindrical walls and compressing the fillet 18 between the end 11 of the glass tip and the bottom 17 of the cavity 12 so that the same is under compression and is deformed so as to flow sufficiently to completely conform to and fill all interstices and irregularities in and between the opposed surfaces. Following the press fitting of the glass and metal tips and compression of the imperforate fillet 18 therebetween, the assembly is pressure tested with water forced under pressure into the barrel 5. If in this test water passes around the fillet 18 and discharges through the tip it is an indication that the seal is not liquid tight and that the assembly is defective and those assemblies which do not pass this test may be rejected. After the press-fitting and testing operations a drill 21, as indicated in Fig. 2 is inserted through the bore of the effluent tip 13 and the center of the fillet 18 is drilled out to the same diameter as the bores 8 and 16, thereby providing a connection between them and producing a continuous effluent passage with smooth unbroken walls free of cracks or crevices from the bottom of the barrel 5 to the effluent end of the tip 13.

The pressure testing of the joint made possible by the imperforate fillet 18 before drilling and the smooth unbroken bore surface produced by the method of the invention are important features because it is very important that the joint be fluidtight and that no space for the trapping of foreign matter or fluids be present in the tip of the syringe which might provide a place for bacteria to build up or permit the possible mixing of drugs or medicines to be administered with the syringe. The smooth unbroken bore produced by the invention is easily cleaned and sterilized and eliminates all possibility of any foreign matter or fluids being trapped therein.

While it is preferred to have the bottom 17 of the cavity in the metal tip formed as a flat surface, the same may be formed with a narrow ring or rib 22 concentric with and surrounding the end of the bore 16. The rib 22, when the parts are forcibly brought together on assembly absorbs the shock of impact since the upstanding rib will first be pressed into the plastic before the final impact of the glass tip into the socket.

Although preferred embodiments and the preferred method of producing the invention have been shown and described by way of illustration, it will be understood that various other modifications and minor changes therein may be resorted to without departing from the spirit of the invention within the scope of the appended claims.

I claim:

1. In a glass syringe adapted for sterilization and repeated usage, a glass barrel having a substantially cylindrical, smooth integral glass tip at one end thereof of reduced diameter with respect to the barrel, said tip having an axial bore extending therethrough opening to the interior of the barrel and a flat end face normal to the axis thereof, a metal tip formed with a socket for reception of said glass tip and having a press fit thereon, said metal tip having a tapered nozzle for reception of the hub of a hypodermic needle and an axial bore through said nozzle opening into said socket, said bores in said glass and metal tips being of the same diameter and in axial alignment and a synthetic plastic fillet under compression between and conformed to the facing surfaces of the end of the glass tip and the bottom of said socket, said plastic fillet having an axial bore therethrough of the same diameter as and in axial alignment with the bores in said glass and metal tips and communicating therewith and being formed of a deformable non-toxic organic synthetic plastic material capable of withstanding sterilizing temperatures and chemically inert with respect to drugs and medicines administered by hypodermic injection, the bores in said glass and metal tips and interposed fillet forming an effluent passage from said barrel having a continuous unbroken wall surface.

2. A glass syringe according to claim 1 in which the plastic fillet is nylon.

3. A glass syringe according to claim 1 in which the plastic fillet is polytetrafluorethylene.

4. A glass syringe according to claim 1 in which the plastic fillet is composed of polytrifluorochloroethylene.

5. The method of making a metal tipped glass hypodermic syringe which comprises forming a glass syringe barrel with a substantially cylindrical, smooth integral glass tip having an axial bore therethrough, forming a flat end face on said glass tip, forming a metal tip with a socket dimensioned for a press fit on said glass tip and with a needle hub mounting nozzle having an axial bore therethrough, inserting a fillet of deformable plastic material in said socket, forcing the glass tip into the socket in the metal tip to form a press fit connection between the glass and metal tips and to place the plastic fillet under compression between the end face of the glass tip and the bottom of the socket in the metal tip whereby the plastic fillet absorbs the impact of the end of the glass tip in the bottom of the socket and the material of said plastic fillet is caused to conform to the facing surfaces of the tip end and socket, and drilling a bore through the compressed plastic fillet in alignment with the bores of said glass tip and nozzle.

GEORGE M. HICKEY.

References Cited in the file of this patent

UNITED STATES PATENTS

| Number | Name | Date |
|---|---|---|
| 1,471,644 | Bandman | Oct. 23, 1923 |
| 1,742,497 | Dickinson | Jan. 7, 1930 |
| 1,961,490 | Hein | June 5, 1934 |
| 2,158,593 | Scrimgeour | May 16, 1939 |
| 2,169,371 | Payne | Aug. 15, 1939 |
| 2,371,086 | Watson et al. | Mar. 6, 1945 |
| 2,483,825 | Goldberg | Oct. 4, 1949 |

FOREIGN PATENTS

| Number | Country | Date |
|---|---|---|
| 15,545 | Switzerland | Oct. 25, 1897 |
| 494,921 | Great Britain | Nov. 3, 1938 |
| 530,407 | France | Oct. 1, 1921 |